United States Patent [19]

MacGuire

[11] Patent Number: 4,702,272
[45] Date of Patent: Oct. 27, 1987

[54] VALVE DEVICE FOR INCREASING THE FUEL ECONOMY AND REDUCING THE EMISSIONS FROM AN INTERNAL COMBUSTION ENGINE

[75] Inventor: Andrew E. MacGuire, Willowdale, Canada

[73] Assignee: The Ferry Cap & Set Screw Company, Cleveland, Ohio

[21] Appl. No.: 391,167

[22] Filed: Jun. 24, 1982

[51] Int. Cl.$^4$ ............................................. F02M 25/00
[52] U.S. Cl. ................................ 137/480; 137/516.11; 123/585
[58] Field of Search ............... 137/480, 479, 480, 482, 137/483, 516.11; 123/585, 587

[56] References Cited

U.S. PATENT DOCUMENTS

| | | | |
|---|---|---|---|
| 922,486 | 5/1909 | Westaway | 137/516.11 |
| 1,578,680 | 3/1926 | Poole | 137/480 |
| 4,024,846 | 5/1977 | MacGuire | 123/585 |
| 4,172,439 | 10/1979 | MacGuire | 137/480 X |

Primary Examiner—Martin P. Schwadron
Attorney, Agent, or Firm—Renner, Otto, Boisselle & Lyon

[57] ABSTRACT

Valve device includes a valve chamber containing three spherical members in stacked relation which produce a limited pulsating air flow that is metered in precise amounts at any given time into the fuel/air path of a gasoline powered internal combustion engine. The valve chamber has a main entry orifice and one or more supplemental entry orifices, the size and number of which may be varied to obtain the desired range or spread of frequencies for a particular engine over its entire operating range.

15 Claims, 3 Drawing Figures

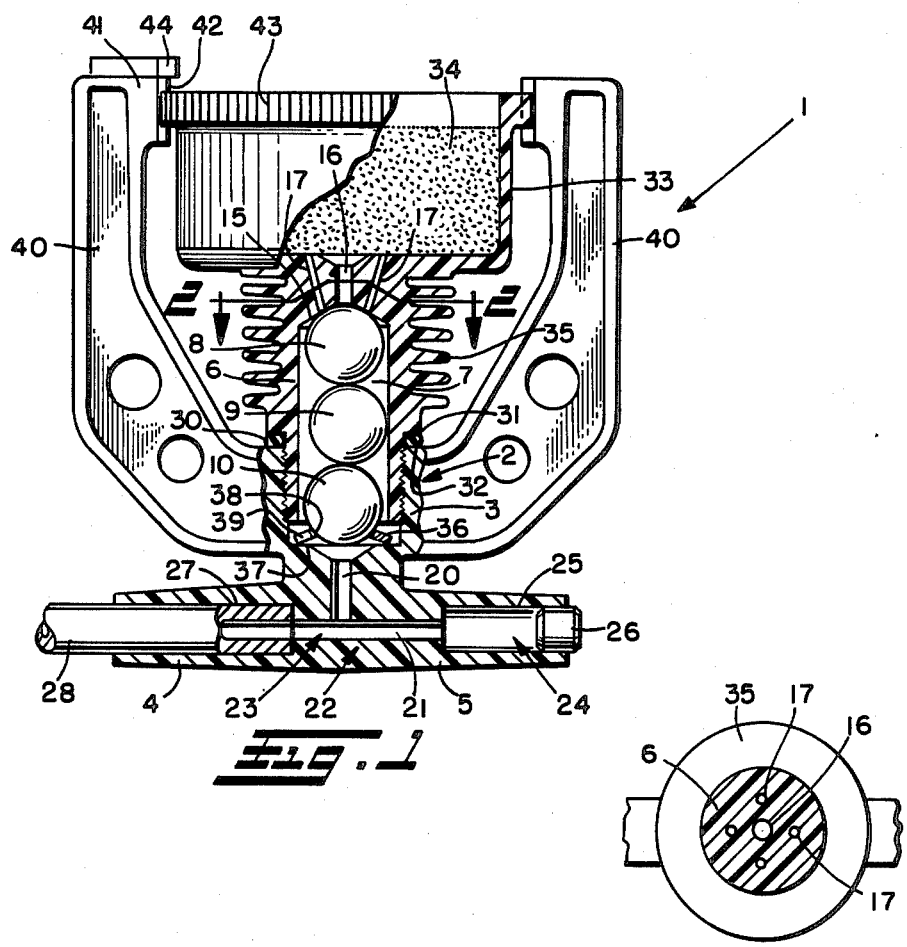
Fig. 1
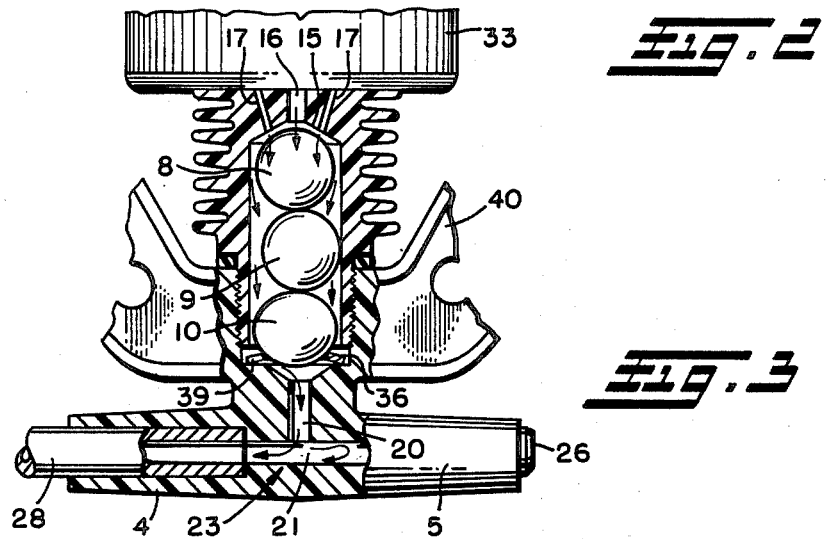
Fig. 2
Fig. 3

VALVE DEVICE FOR INCREASING THE FUEL ECONOMY AND REDUCING THE EMISSIONS FROM AN INTERNAL COMBUSTION ENGINE

CROSS REFERENCE TO RELATED PATENTS

This application relates to certain improvements in valve devices of the type disclosed in U.S. Pat. Nos. 3,693,650; 3,799,132; 4,024,846; and 4,172,438, the disclosures of which are incorporated herein by reference.

BACKGROUND OF THE INVENTION

The modern automotive internal combustion engine has been recognized as a principal contributor to atmospheric pollution. Devices of various sorts have been developed to control release of crankcase emissions and remove harmful products from the exhaust gases. However, it has long been recognized that if the engines could be made to operate so that substantially complete combustion of the engine fuel occurred under all operating conditions, not only would the amount of objectionable pollutants be substantially reduced, but the power output of the engine and fuel economy would be increased.

Substantially improved results have been obtained with the valves and air supply systems of the aforementioned patents which supply air pulsations to the engine manifold over substantially the entire speed range of the engine for improved engine response and acceleration. Such valve and systems provide automatic adjustment to various throttle settings and rates of acceleration or deceleration, and prevent the emission of excessive pollutants to the atmosphere, particularly carbon monoxide, nitrogen oxide and hydrocarbon vapors.

When properly adjusted, such prior valve devices can be made to resonate over the full operating range of the engine, that is, during idle as well as during cruising and acceleration and deceleration. As the valves resonate, air pulsations are created causing turbulence in the air flow passing through the valves and into the carburetor where pressure waves are set up in the lower part of the carburetor and manifold. These pressure waves assist in breaking up the fuel into smaller, more uniform particle sizes in addition to maintaining a more constant air/fuel mixture over the full operating range, for improved combustion, efficiency, fuel economy, and lower exhaust emissions.

SUMMARY OF THE INVENTION

The valve device of the present invention is of the same general type as that disclosed in the aforementioned U.S. patents, but includes certain additional improvements which permit the range of frequencies of the air pulsations to be further increased and better maintained and controlled over substantially all operating modes of the engine. The spread of frequencies is increased into a higher frequency range while at the same time the lower frequencies may be maintained. Also, with the valve device of the present invention it is possible to adjust the amount of supplemental air flow entering the engine through the valve device while still extending the frequency range.

It has been found that a broad range of frequencies is generally better in obtaining more complete atomization of the fuel and maintaining such fuel atomized until it reaches the engine cylinders for better fuel economy and reduced emissions under rich running operation. The higher frequencies are very narrow and directional in their path and help atomize the fuel and create turbulence, whereas the mid and low frequencies help to keep the atomized fuel in suspension, carrying the atomized fuel through the manifold and into the cylinders.

Generally speaking, the smaller the engine, or the later the model of car, the higher frequencies are more desirable and also cut down on the amount of air flow through the valve device.

In accordance with the present invention, the valve device includes three spherical members in stacked relation within the valve chamber. Air flow into the valve chamber is through a main entry orifice and one or more smaller supplemental entry orifices surrounding the main entry orifice at one end of the valve chamber. An exit orifice is provided at the opposite end of the valve chamber. The size and number of entry orifices may be varied to obtain the desired range or spread of frequencies for a particular engine over its entire operating range.

Further in accordance with the invention, the entry orifices may be graded for the size of the particular engine, thus making it possible to tailor the valve device to such engine. The supplemental entry orifices create more of the higher frequencies and cause such higher frequencies to remain more constant over all driving modes for better fuel atomization. Also, the amount of supplemental air flow passing through the valve device into the engine may be reduced by reducing the number and size of entry orifices which also increases the number of higher frequencies and reduces the number of lower frequencies. Moreover, because of the improved atomization of the fuel, the engine warms up much quicker, thus permitting the choke time to be substantially reduced.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a preferred form of improved valve device in accordance with this invention, the valve device being shown in its closed condition when the engine is not running;

FIG. 2 is an enlarged transverse section through the valve seat of the device of FIG. 1 showing the main and supplemental entry orifices therein; and FIG. 3 is a fragmentary longitudinal section through the valve device, similar to FIG. 1, but showing the normal open condition of the valve device during substantially all operating modes, except deceleration.

DETAILED DESCRIPTION OF THE PREFERRED EMBODIMENT

Referring now in detail to the drawings, and initially to FIG. 1, a preferred form of valve device in accordance with this invention is generally indicated by the reference numeral 1. Such valve device is designed for use with a gasoline engine to which an air/fuel mixture is supplied by a carburetor, and is not suitable for diesel or fuel injection engines.

Preferably, the valve device includes a plastic body 2 which may be of generally T-shape including a hollow cylindrical portion 3 and oppositely extending tubular arms 4, 5. Threadedly adjustably received within such cylindrical body portion is a tubular casing 6 having a cylindrical chamber 7 therein for receipt of three imperforate spherical balls 8, 9 and 10, each of which is of a diameter slightly less than the inner diameter of the cylindrical chamber for a purpose to be subsequently described. Adjacent the axial outer end of the cylindrical chamber is a valve seat 15 which is desirably suitably conically tapered to provide a more positive seal when contacted by the adjacent spherical ball 8 which acts as a spherical valve member when the engine is not running and the valve is in the closed condition shown in FIG. 1. Such a conical valve seat also assists in providing better response for increased resonation of the balls during operation, as will be described more fully hereafter.

Extending through the valve seat 15 is a main entry or inlet orifice 16 and one or more supplemental entry orifices 17. The main entry orifice 16 desirably extends through the axial center of the valve seat, whereas the supplemental entry orifices 17 are desirably slightly spaced from the axial center but in close proximity thereto so that all of the entry orifices will be closed off by the spherical valve member 8 when fully seated against the valve seat as previously described.

Communicating with the opposite end of the cylindrical chamber 7 is a narrow exit orifice 20 in the valve body 2 which desirably intersects at a right angle with a longitudinally extending passage 21 in the body cross member 22 to provide an outlet passage 23 from the valve including a right angle turn. One end of the longitudinal passage 21 may communicate with a swirl chamber 24 at one end of the cross member formed as by providing a counterbore 25 in such one end, with a plug 26 inserted in the outer end thereof. The other end of the cross member also has a counterbore 27 therein for receipt of a tubular delivery line 28 to provide communication between the valve outlet and the engine carburetor.

An O-ring seal 30 is interposed between an annular flange 31 on the tubular casing and the adjacent end 32 of the plastic body to prevent air from entering the valve device except through the entry orifices 16, 17. An enlarged cup-shape extension 33 may be formed as an integral molded part on the outer end of the tubular casing 6 for receipt of an air filter 34 to permit fresh filtered air to pass directly into the valve. The filter is desirably quite large in relation to the entry orifices to permit the valve device to be used for long periods of time without having to clean or change the filter. Suitable cooling fins 35 may also be integrally molded as a part of the tubular casing, running substantially the full exterior length thereof, as shown.

Within the cylindrical chamber 7 adjacent the exit or outlet orifice 20 is a frustoconical serrated washer 36 supported by an annular shoulder 37 on the cylindrical body portion surrounding such outlet orifice. The washer has a circular central opening 38 of a diameter less than the diameter of the spherical ball 10 and a plurality of outer peripheral notches 39. Rotating the casing 6 relative to the body portion 2 will cause the casing to move axially in or out to move the valve seat 15 toward or away from the washer to vary the length of the chamber 7 containing the balls 8-10 and thereby subject the latter to a predetermined degree of compression.

The casing may be suitably resisted in its turning movement to prevent undesirable rotation due to vibrations and the like as by providing a pair of arms 40 which may be molded as an integral part of the cylindrical body portion. The arms may extend outwardly from opposite sides of the cylindrical body portion, and may be provided with inwardly facing extensions 41, suitably notched at 42 for engagement with a notched flange 43 on the outer end of the cup-shape extension 33. The arms, being made of plastic, are sufficiently flexible to permit a ratchet effect to occur between the notches and notched flange when a suitable torque is applied to the casing to permit turning. to spread the arms sufficiently apart to free the casing flange from engagement with the stop shoulder.

The valve body and casing are desirably made of a suitable plastic material such as Delron which will not deteriorate under warm or humid operating conditions in the presence of oil and gasoline fumes. Likewise, the balls are made of a suitable plastic material which will withstand the temperature ranges to which the balls are subjected without adversely affecting the operation of the balls. When properly adjusted, the ball valve member 8 will be unseated as shown in FIG. 3 due to changes in pressure caused by the engine vacuum acting on the valve through the air delivery line 28, and the balls 8-10 will vibrate at resonance over the entire operating range of the engine, causing shock waves in the airstream passing through the valve into the engine.

Preferably, the balls are of different hardnesses to obtain better control of the supplemental air flow to the engine. The main resonating effect occurs at the spherical valve member 8 which engages the valve seat 15 and allows small amounts of metered air to pass through the entry orifices 16, 17 when required. Because the valve is responsive to the engine vacuum, making the spherical valve member 8 of a semi-hard material and providing a conical valve seat therefor causes the spherical valve member to be more responsive to lower engine vacuums and provides increased resonation during all modes of operation. The semi-hard spherical valve member engaging the conical valve seat also provides a more positive seal, completely sealing off the entry orifices when the engine is not running to keep out moisture. Also, minute dust particles and the like in the air will not allow air seepage through the valve when closed as they might if the spherical valve member were too hard.

The hardness of the ball member 10 furthest from the spherical valve member is preferably somewhat less, whereby during deceleration the high vacuum developed in the engine manifold will cause the ball member 10 to be compressed and bulge laterally more than the other two balls 8, 9, to such an extent to restrict further the supplemental air flow through the valve during deceleration. As the vacuum drops off, the tendency of the ball member 10 to spring back to its original shape positively urges the intermediate ball 9 against the spherical valve member 8 tending to close the entry orifices 16, 17. The intermediate ball is preferably of a much harder material than the other two balls, acting as a piston therebetween, to provide instant response between the other two balls and promote high frequency pulsations of the device.

In the valve device embodiment disclosed herein, there are five entry orifices, consisting of a single main central entry orifice 16 and four supplemental entry orifices 17 uniformly circumferentially spaced therearound as shown in FIG. 2. The main entry orifice is desirably of a diameter somewhat larger than the supplemental entry orifices. For example, the main entry orifice may have a diameter of approximately ⅛ inch, and the supplemental entry orifices may have a diameter of between 1/16 inch and 1/32 inch. However, it should be understood that the number and size of such entry orifices 16, 17 may be varied as desired to obtain the desired range or spread of frequencies for a particular engine as well as the desired amount of supplemental air flow passing through the valve device into the engine over its entire operating range.

It is the passage of air through the entry orifices 16, 17 that causes the balls 8-10 to resonate at different frequencies in accordance with the velocity of air passing through the orifices. The velocity of the air passing through the larger main entry orifice 16 is of course less than the air velocity through the smaller supplemental entry orifices 17, whereby the frequencies produced by the air passing through the larger main orifice are lower than the frequencies produced by the air passing through the smaller supplemental entry orifices. Also, it has been found that the higher frequencies generated by the smaller entry orifices 17 are more constant over the entire operating range of the engine, and are easier to control by controlling the number and size of supplemental entry orifices, thus making it possible to tailor the valve device to the particular engine involved.

In actual tests, it has been found that the valve device of the present invention will provide a broader range or spread of frequencies and more of the higher frequencies with better control over the frequencies. In general, the higher frequencies have been found to be more effective in obtaining more complete atomization of the fuel, whereas the mid and low frequencies help to keep the atomized fuel in suspension and carry the atomized fuel through the manifold and into the engine cylinders for better fuel economy and reduced emissions. Also, it has been found with the improved atomization that results from using the valve device of the present invention, the choke period of the engine on cold starting will be substantially reduced.

The actual range of frequencies best suited for a particular engine will vary depending on its size, the type of carburetor, etc. For example, for the larger engines, it is generally desirable to include more of the lower frequencies, whereas for smaller engines or later model cars, it is generally desirable to have more of the higher frequencies. With the higher frequencies there is also less air flow through the valve device, which is useful in helping to hold the carburetor closer to stoichiometric conditions over all driving modes.

For a larger engine, the valve device may have a single main entry orifice 16 and four smaller diameter supplemental entry orifices 17, whereas for a smaller engine, a single main entry orifice and one or two supplemental entry orifices may be sufficient. The number of higher frequencies may also be increased by reducing the size of the main entry orifice, but of course that would reduce the range or spread of frequencies.

The amount of air flow through the valve device may also be varied within limits by rotating the casing 6 relative to the body 2 to vary the preload on the balls 8-10 in the manner previously described. However, the amount of preload on the balls will normally be dictated by the frequency range desired and not by how much air is passing through the valve. Accordingly, the most effective way to vary the air flow through the valve device is to vary the size and/or number of entry orifices 16, 17 therein. However, as the size and number of entry orifices are reduced, the range of frequencies and number of lower frequencies will also be reduced.

Also, the amount of air flow through the device may be reduced by reducing the clearance between the balls 8-10 and chamber wall. Some increase in the higher frequencies may also be obtained by increasing the density of the balls.

When the engine is not running, the single spherical valve member 8 closes off all of the entry orifices 16, 17 as shown in FIG. 1. As soon as the engine starts running, the balls 8-10 begin to resonate, creating shock waves in the airstream passing through the valve device as schematically shown in FIG. 3. The injection of such additional pulsating air into the carburetor and manifold increases the turbulence of the fuel/air mixture and thoroughly mixes the required amount of air with the fuel within the engine for improved combustion and fast response at substantially all operating speeds. The outer peripheral notches 39 in the washer 36 also assist in creating a swirling action of the air passing through the valve, whereby the air enters the carburetor and manifold in sonic waves combined with a swirling motion for increased turbulence.

As long as the engine is running, the valve device will remain open, and the air flow through the device will be substantially the same over the full operating range of the engine except during high deceleration as aforesaid. Also, the frequencies of the air pulsations created by the ball movements will remain more constant over a broad range of operating modes because of the supplemental entry orifices which extend or spread the frequency range and provide better control over such frequencies.

As will be appreciated, the dimensions of the various valve parts may be varied to generate different air flow rates and different magnitudes of air pulsations from the valve. However, one such valve device which has performed quite satisfactorily included three balls 8-10 each approximately ½ inch in diameter. The spherical valve member 8 was made of a suitable polyurethane material having a hardness of approximately 89 on the Shore scale. The ball 10 furthest from the spherical valve member was made of the same material but having a hardness somewhat less, for example, 0.5 less or approximately 88.5 on the Shore scale. The intermediate ball 30 was made of a harder material than the balls 8, 10, such as nylon, teflon, or Celcon having little or no resilience. The inner diameter of the cylindrical chamber was slightly greater than the diameter of the balls, in the range of 15 to 30 hundredths of an inch greater. Also, the main entry orifice 16 was approximately ⅛ inch in diameter, whereas the supplemental entry orifices 17 were in the range of approximately 1/16 to 1/32 inch in diameter depending on the engine requirements. The exit orifice 21 and air delivery line 28 from the valve device to the carburetor were approximately 13/64 inch in diameter, and the diameter of the swirl chamber 24 in the body portion 2 was approximately ⅜ inch.

As previously indicated, actual tests have shown that a valve device with the supplemental entry orifices of the present invention will produce more of the higher frequencies than are obtainable with a similar valve device but without the supplemental entry orifices. Also, such a valve device is able to maintain more of such higher frequencies over a much wider spread or operating range.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the claims.

The embodiments of the invention in which an exclusive property or privilege is claimed are defined as follows:

1. A valve device comprising a valve chamber having a main entry orifice and an exit orifice, valve means within said chamber intermediate said main entry orifice and exit orifice responsive to a vacuum at said exit orifice to produce a substantially constant pulsating air flow through said valve, and supplemental entry orifice means communicating with said chamber for imparting a range or spread of frequencies to the pulsating air flow through said valve, said valve means including an imperforate spherical member within said chamber intermediate said exit orifice and said main entry orifice and said supplemental entry orifice means, said supplemental entry orifice means comprising at least one supplemental entry orifice to said chamber, said main entry orifice having a greater diameter than said supplemental entry orifice.

2. The valve of claim 1 wherein there are a plurality of said supplemental entry orifice means for providing a relatively high frequency range to the pulsating air flow through said valve.

3. The valve of claim 1 further comprising a valve seat, said main entry orifice and supplemental entry orifice means communicating with said chamber through said valve seat.

4. The valve of claim 3 wherein said valve means is engageable with said valve seat to seal off said main entry orifice and supplemental entry ofirice means when there is no vacuum at said exit orifice.

5. The valve of claim 3 wherein said main entry orifice extends through the axial center of said valve seat, and said supplemental entry orifice means extends through said valve seat radially spaced from said axial center.

6. The valve of claim 1 wherein said main entry orifice has a diameter of approximately ⅛ inch, and said supplemental entry orifice has a diameter in the range of approximately 1/16 to 1/32 inch.

7. The valve of claim 3 wherein said valve seat is conically tapered and said valve means comprises three imperforate spherical members within said chamber, one of said spherical members forming a positive seal with said valve seat completely sealing off said main entry orifice and supplemental entry orifice means when there is no vacuum at said exit orifice.

8. The valve of claim 7 wherein the clearance space between said spherical members and the wall of said valve chamber is relatively small to restrict the air flow through said valve.

9. The valve of claim 8 further comprising a frusto-conical serrated washer within said chamber surrounding said outlet orifice, said washer having a plurality of outer peripheral notches and a central circular opening of a diameter less than the diameter of said spherical members, said valve chamber comprising two cylindrical portions threadedly axially connected together for relative rotation to vary the longitudinal extend of said chamber and thereby subject said spherical members to a predetermined degree of compression.

10. The valve of claim 1 wherein said supplemental entry orifice means comprises a plurality of supplemental entry orifices which are smaller in diameter than said main entry orifice and impart a range or spread of frequencies to the pulsating air flow through said valve.

11. The valve of claim 1 wherein said entry and exit orifices are relatively narrow to restrict the air flow through said valve.

12. The valve of claim 1 further comprising a valve seat, said entry orifice and supplemental entry orifice means communicating with said chamber through said valve seat, one of said spherical members being engageable with said valve seat to form a positive seal completely sealing off said entry orifice and supplemental entry orifice means when there is no vacuum at said exit orifice.

13. A valve device comprising a valve chamber having a main entry orifice and an exit orifice, valve means within said chamber intermediate said main entry orifice and exit orifice responsive to a vacuum at said exit orifice to produce a substantially constant pulsating air flow through said valve, and supplemental entry orifice means communicating with said chamber for imparting a range or spread of frequencies to the pulsating air flow through said valve, said valve means including an imperforate spherical member within said chamber intermediate said exit orifice and said main entry orifice and said supplemental entry orifice means, a valve seat, said main entry orifice and supplemental entry orifice means communicating with said chamber through said valve seat, said main entry orifice extending through the axial center of said valve seat, and said supplemental entry orifice means extending through said valve seat radially spaced from said axial center, said main entry orifice having a diameter greater than said supplemental entry orifice means.

14. The valve of claim 13 wherein said supplemental entry orifice means comprises a plurality of supplemental entry orifices of smaller diameter than said main entry orifice surrounding said main entry orifice.

15. The valve of claim 14 wherein there are four supplemental entry orifices surrounding said main entry orifice.

* * * * *